3,200,109

WATER-INSOLUBLE MONOAZO-DYESTUFFS
Joachim Ribka, Offenbach (Main), Germany, assignor to Farbwerke Hoechst Aktiengesellschaft vormals Meister Lucius & Brüning, Frankfurt am Main, Germany, a corporation of Germany
No Drawing. Filed Aug. 29, 1962, Ser. No. 220,147
Claims priority, application Germany, Aug. 30, 1961, F 34,813
6 Claims. (Cl. 260—203)

The present invention relates to new water-insoluble monoazo-dyestuffs and to a process for preparing them; more particularly it relates to dyestuffs of the general formula

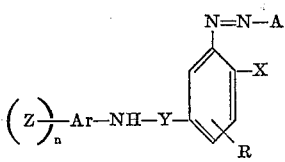

wherein X represents hydrogen, a halogen atom, an alkyl, alkoxy, aryloxy, alkylsulfone, arylsulfone, cyano or carboxylic acid ester group, R represents hydrogen, a halogen atom or an alkoxy group, Y stands for a $SO_2$- or CO-group, Ar represents a phenylene or naphthylene radical which may be substituted by halogen atoms, alkyl or alkoxy groups, Z represents a carboxylic acid amide or sulfonic acid amide group which may contain substituents, an acylamino, alkylsulfonylamino or arylsulfonylamino group, $n$ stands for 1 or 2, and A represents the radical of a coupling component free from sulfonic acid and carboxylic acid groups and capable of coupling in a position adjacent to a hydroxyl group.

I have found that valuable, water-insoluble monoazo-dyestuffs are obtained by coupling a diazonium compound of an amine of the general formula

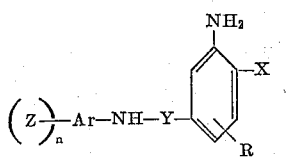

wherein X represents hydrogen, a halogen atom, an alkyl, alkoxy, aryloxy, alkylsulfone, arylsulfone, cyano or carboxylic acid ester group, R represents hydrogen, a halogen atom or an alkoxy group, Y stands for a $SO_2$- or CO-group, Ar represents a phenylene or naphthylene radical which may be substituted by halogen atoms, alkyl or alkoxy groups, Z represents a carboxylic acid amide or sulfonic acid amide group which may contain substituents, an acylamino, alkylsulfonylamino or arylsulfonyl-amino group, and $n$ stands for 1 or 2, with a coupling component free from sulfonic acid and carboxylic acid groups and capable of coupling in a position adjacent to a hydroxyl group.

The amines used as diazo components in the process of the present invention can generally be prepared by condensing a nitrobenzoic acid chloride or nitrobenzene sulfonic acid chloride of the formula

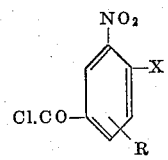

or

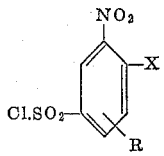

with an aromatic amine of the general formula $$H_2N-Ar-(Z)_n$$

wherein X, R, Ar, Z and $n$ have the meanings indicated above, and subsequent reduction. They can, however, also be prepared by other methods, for example by condensing an acetylaminobenzene sulfochloride of the formula

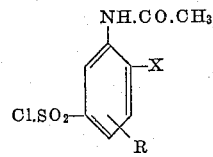

with the above-mentioned aromatic amines of the formula $H_2N-Ar-(Z)_n$ and subsequent splitting off of the acetyl group. As appropriate aromatic amines of the formula $H_2N-Ar-(Z)_n$, which are suitable for the preparation of the diazo components, there may be mentioned for example: aminobenzene carboxylic acid amides, aminobenzene dicarboxylic acid diamides, aminobenzene sulfonic acid amides and aminobenzene disulfonic acid diamides, the amide groups of which may contain substituents, furthermore monoacylated phenylene diamines, diacylated phenylene triamines and aminobenzenes containing one or two alkylsulfonylamino or arylsulfonylamino groups, whereby these amines may contain in the aromatic radical further substituents, such as halogen atoms, alkyl or alkoxy groups.

The diazonium compounds may be prepared in known manner. In some cases the diazonium compounds are difficultly soluble in an aqueous medium and are separated in the form of their salts. These salts can be isolated and coupled in the form of a moist paste. In these cases it is advantageous to carry out the diazotization in a suitable organic solvent, such as glacial acetic acid, acetone, dioxane, tetrahydrofurane, formamide, dimethyl formamide or dimethyl sulfoxide, and to combine the solution of the diazonium compound so obtained with the coupling component.

As coupling components there are used in the process of the present invention compounds capable of coupling in a position adjacent to a hydroxyl group, for example aromatic or heterocyclic hydroxyl compounds and compounds containing in an open carbon chain or in a heterocyclic ring an enolizable or enolized ketomethylene group. Compounds of this kind are, in particular, the arylamides of 2,3-hydroxynaphthoic acid or acetoacetic acid, whereby the arylamide radical may belong to the benzene, naphthalene or diphenylene oxide series and may contain one or more substituents which do not impart solubility in water, for example halogen atoms, alkyl, alkoxy, aryloxy, nitro, carboxylic acid amide, sulfonic acid amide, acylamino, arylsulfonylamino and alkylsulfonylamino groups, As further coupling components there may be mentioned, for example, derivatives of 5-pyrazolone, such as 1-aryl-3-methyl-5-pyrazolones, 1-aryl-5-pyrazolone-3-carboxylic acid esters or 1-aryl-5-pyrazolone-3-carboxylic acid amides, whereby the aryl radical may contain the above-mentioned non-solubilizing substituents, furthermore 2,4-dihydroxy-quinoline or barbituric acid derivatives.

The novel dyestuffs can be prepared by known methods, for example by coupling the diazonium compounds with the coupling components in an aqueous medium, advantageously in the presence of a dispersing agent or in the presence of an organic solvent. In order to obtain a favorable granular condition of the azodyestuffs, it is advantageous in some cases to add resin soap to the reaction mixture after coupling and/or to heat the mixture, for example for some time at the boil, or to mix, while stirring, and/or heating, if desired, the isolated dyestuff in a moist or dry state for some time with an organic solvent, such as pyridine, glacial acetic acid, dimethylformamide, quinoline or chlorobenzene.

The dyestuffs obtainable by the process of the present invention are water-insoluble pigments which are distinguished especially by a good fastness to solvents. They are suitable for the preparation of colored lacquers, lake formers, solutions and products prepared from acetyl cellulose, natural resins or synthetic resins, such as polymerization or condensation resins, for example aminoplasts or phenoplasts, as well as solutions and products prepared from polystyrene, polyolefins, such as polyethylene or polypropylene, polyacryl compounds, polyvinyl compounds, for example polyvinyl chloride or polyvinyl acetate, polyesters, rubber, casein or silicon resins.

Furthermore, the novel dyestuffs can be used for pigment printing on a substratum, especially on a textile fiber and also on other flat structures, for example on paper. They can also be used for other purposes, for example in a finely divided form for dyeing rayon of viscose or cellulose ethers or cellulose esters, polyamides or polyurethanes in the spinning solution or for coloring paper.

The following examples illustrate the invention, but they are not intended to limit it thereto, the parts being by weight unless otherwise stated, and the relationship of parts by weight to parts by volume being the same as that of the kilogram to the liter.

*Example 1*

198 parts of 3-nitro-4-methoxy-benzoic acid were heated under reflux in 200 parts by volume of thionyl chloride until the evolution of hydrogen chloride had ceased. The thionyl chloride in excess was then distilled off in an air current, the residue was cooled and dissolved in 500 parts by volume of acetone. The solution of 3-nitro-4-methoxy-benzoic acid chloride so obtained was filtered and under stirring and external cooling at a temperature of 15° to 20° C. run into a solution of 140 parts of 4-aminobenzoic acid amide in 150 parts by volume of pyridine, 600 parts by volume of dioxane and 150 parts by volume of water. When the condensation was complete, the reaction mixture was acidified with hydrochloric acid, the reaction product was filtered off with suction and washed. The 1-(3'-nitro-4'-methoxybenzoylamino)-benzene-4-carboxylic acid amide so obtained melted at 302° to 304° C. It was converted by catalytic reduction with hydrogen in the presence of Raney-nickel in methanol into the 1-(3'-amino-4'-methoxybenzoylamino)-benzene-4-carboxylic acid amide of the formula

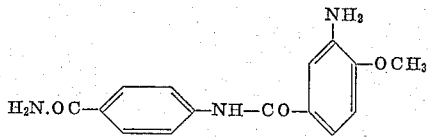

The product melted at 291° C.

*Example 2*

28.5 parts of 1-(3'-amino-4'-methoxybenzoylamino)-benzene-4-carboxylic acid amide were heated to 70° C. with 600 parts of water and 60 parts by volume of 5 N-hydrochloric acid. The solution so obtained was cooled to 15° C., diazotized with 20 parts by volume of a 5 N-solution of sodium nitrite and the diazo solution obtained was clarified. In the meantime 37 parts of 1-(2',3'-hydroxynaphthoylamino) - 2,5 - dimethoxy-4-chlorobenzene were dissolved in hot dilute sodium hydroxide solution. The hot solution was cooled, clarified and precipitated at 0° C. with acetic acid in the presence of a reaction product from about 20 mols of ethylene oxide and 1 mol of oleyl alcohol. The suspension obtained was heated to 65° to 75° C. and coupled at this temperature with the diazo solution mentioned above. During the coupling operation the mixture was neutralized by the addition of a sodium acetate solution. The mixture was then stirred for 1 hour, boiled for 1 hour and then filtered off with suction, washed and dried. It was advantageous to add resin soap to the dyestuff after coupling. There was obtained a dyestuff of the formula.

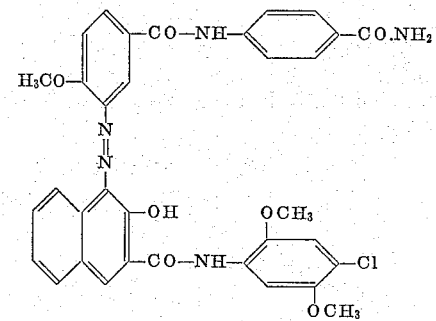

It is a bluish-red pigment which, when incorporated in polyvinyl chloride, a lacquer or a printing ink, yields carmine red colorations possessing good fastness properties, especially a very good fastness to solvents.

*Example 3*

32.1 parts of 1-(3'-amino-4'-methoxybenzoylamino)-benzene-4-sulfonic acid amide were stirred for some time with 60 parts by volume of 5 N-hydrochloric acid. The paste formed was diluted with water and diazotized at 15° C. with 20 parts by volume of a 5 N-solution of sodium nitrite. The clarified diazo solution was run at 18° C. into an aqueous suspension of 29 parts of 1-acetoacetylamino-2,5-dimethoxy-4-chlorobenzene, which had been prepared by dissolving this compound in dilute sodium hydroxide solution and reprecipitating it with glacial acetic acid in the presence of a reaction product from about 20 mols of ethylene oxide and 1 mol of octadecyl alcohol. During the coupling operation the mixture was neutralized by the addition of a sodium acetate solution. When the coupling was complete, the mixture was stirred for 1 hour and boiled for 1 hour. The dyestuff was then filtered off with suction, washed and dried. It was advantageous to add resin soap to the dyestuff after coupling. A yellow dyestuff of the formula

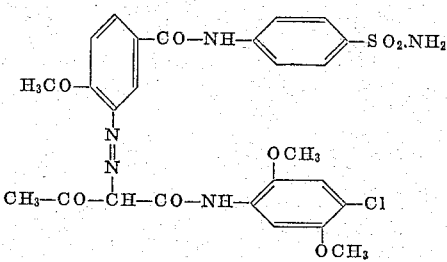

was obtained.

The yellow colorations produced with this dyestuff show in various working media, such as lacquers, printing inks and plastics, a good fastness to solvents.

*Example 4*

30.4 parts of 1-(3'-amino - 4' - chlorobenzoylamino)-4-acetyl-aminobenzene were stirred for some time with 400 parts by volume of glacial acetic acid and 50 parts by volume of 5 N-hydrochloric acid, the hydrochloride of the amine being formed. 20 parts by volume of a 5 N-solution of sodium nitrite were added, the solution was stirred for a short time, then diluted with 300 to 400 parts by volume of water and the solution so obtained was clarified. The diazo solution so obtained was coupled with a clarified solution of 30 parts of 1-(2',3'-hydroxynaphthoylamino)-4-methoxybenzene in 1000 parts by volume of pyridine, the dyestuff being formed. The mixture was stirred for about 1 hour, then diluted with water, and the dyestuff was filtered off with suction, washed and dried. There was obtained a dyestuff of the formula.

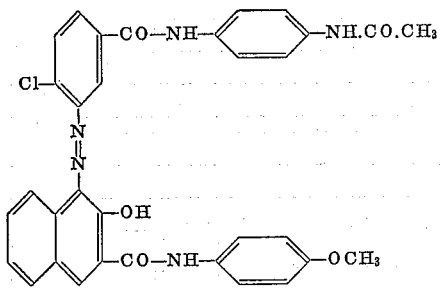

It is a red powder. The colorations of the various working media, such as lacquers, plastics and printing inks, with this dyestuff are distinguished by a good fastness to solvents.

*Example 5*

28.5 parts of 1-(3'-amino-4'-methoxybenzoylamino)-benzene-4-carboxylic acid amide were diazotized as described in Example 2. Furthermore, 37 parts of 1-(2',3'-hydroxynaphthoylamino)-2,4-dimethoxy-5-chlorobenzene were dissolved in hot dilute sodium hydroxide solution, the solution was cooled and clarified. Both solutions were run simultaneously at room temperature within about 1 to 2 hours into a mixture of 400 parts by volume of water and 22 parts by volume of glacial acetic acid in the presence of a reaction product from about 20 mols of ethylene oxide and 1 mol of oleyl alcohol. The mixture was stirred until the coupling was complete, the dyestuff formed was filtered off by suction and washed with water. The moist dyestuff cake was stirred with 1000 parts by volume of chlorobenzene, the water was distilled off azeotropically and the mixture was heated for another hour under reflux. The dyestuff was then filtered off with suction and the adhering chlorobenzene was removed by distillation with steam or by washing with methanol. After drying there was obtained a dyestuff of the formula

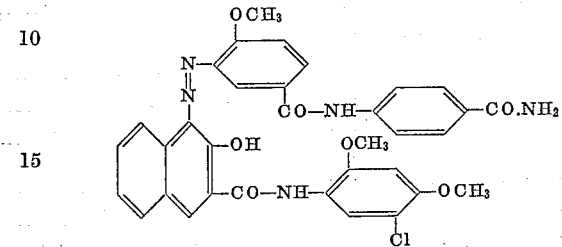

When incorporated in polyvinyl chloride, a lacquer or a printing ink, it yields carmine red colorations of good fastness to light and to solvents.

*Example 6*

The coupling was carried out as described in Example 5 and, when the coupling was complete, the dyestuff formed was filtered off with suction and dried. There was obtained a pigment possessing a hard grain and exhibiting a low tinctorial strength. By heating this pigment to 95° C. in 1000 parts by volume of dimethyl-formamide, subsequently filtering with suction, washing and drying a pigment was obtained which in its properties corresponds to the dyestuff described in Example 5.

Instead of dimethylformamide other organic solvents, for example quinoline, may be used.

The following table indicates a number of further components which can be used in the process of the present invention, and also the tints of the printing inks prepared with the monoazo-dyestuffs obtainable from these components.

| Diazo component | Coupling component | Tint |
|---|---|---|
| 1-(3'-amino-benzoylamino)-benzene-4-sulfonic acid amide | 1-(2',3'-hydroxynaphthoylamino)-4-methoxybenzene | Red. |
| 1-(3'-amino-4'-methylbenzoyl-amino)-benzene-4-sulfonic acid amide | 1-(2',3'-hydroxynaphthoylamino)-2,5-dimethoxy-4-chlorobenzene | Do. |
| 1-(3'-amino-4'-methoxybenzoyl-amino)-4-acetylaminobenzene | do | Carmine. |
| 1-(3'-amino-4'-methoxybenzoyl-amino)-benzene-4-carboxylic acid amide | 1-acetoacetylamino-2,5-dimethoxy-4-chlorobenzene | Yellow. |
| Do | 1-phenyl-3-methyl-5-pyrazolone | Reddish-yellow. |
| 1-(3'-amino-4'-methoxybenzoyl-amino)-benzene-4-sulfonic acid amide | 1-(2',3'-hydroxynaphthoylamino)-2,4-dimethoxy-5-chlorobenzene | Ruby. |
| Do | 1-acetoacetylamino-2,4-dimethoxy-5-chlorobenzene | Yellow. |
| Do | 2,4-dihydroxy-quinoline | Reddish-yellow. |
| 1-(3'-amino-4'-methoxybenzoylamino)-2-chlorobenzene-5-carboxylic acid amide | 1-(2',3'-hydroxynaphthoylamino)-2,4-dimethoxy-5-chlorobenzene | Claret. |
| 1-(3'-amino-4'-methoxybenzoylamino)-benzene-3,5-bis-carboxylic acid amide | 1-(2',3'-hydroxynaphthoylamino)-2,5-dimethoxy-4-chlorobenzene | Carmine. |
| Do | 1-(2',3'-hydroxynaphthoylamino)-2,4-dimethoxy-5-chlorobenzene | Claret. |
| 1-(3'-amino-4'-methoxybenzoylamino)-2-methoxybenzene-5-carboxylic acid amide | do | Do. |
| 1-(3'-amino-4'-methoxybenzene-sulfonylamino)-benzene-4-carboxylic acid amide | do | Bluish-red. |
| 1-(3'-amino-4'-chlorobenzene-sulfonylamino)-benzene-4-carboxylic acid amide | 1-(2',3'-hydroxynaphthoylamino)-4-methoxybenzene | Red. |
| Do | 1-acetoacetylamino-2,5-dimethoxy-4-chlorobenzene | Yellow. |
| 1-(3'-amino-4'-chlorobenzoylamino)-4-acetylaminobenzene | 1-(2',3'-hydroxynaphthoylamino)-2-methoxybenzene | Red. |
| Do | 1-acetoacetylamino-2,5-dimethoxy-4-chlorobenzene | Yellow. |
| 1-(3'-amino-4'-chlorobenzoylamino)-benzene-4-sulfonic acid amide | 1-(2',3'-hydroxynaphthoylamino)-4-methoxybenzene | Red. |
| Do | 1-(2',3'-hydroxynaphthoylamino)-4-ethoxybenzene | Do. |
| 1-(3'-amino-4'-chlorobenzoylamino)-benzene-4-carboxylic acid amide | 1-(2',3'-hydroxynaphthoylamino)-4-methoxybenzene | Do. |
| 1-(3'-amino-4'-chlorobenzoylamino)-2-chlorobenzene-5-carboxylic acid amide | do | Do. |
| 1-(3'-amino-4'-chlorobenzoylamino)-2-chlorobenzene-5-sulfonic acid amide | do | Do. |
| 1-(3'-amino-4'-carbomethoxybenzoylamino)-benzene-4-carboxylic acid dimethylamide | do | Do. |
| 1-(3'-amino-4'-methoxybenzoylamino)-benzene-4-carboxylic acid methylamide | 1-(2',3'-hydroxynaphthoylamino)-2,4-dimethoxy-5-chlorobenzene | Bluish-red. |
| Do | do | Do. |
| 1-(3'-amino-4'-methoxybenzoylamino)-benzene-4-carboxylic acid-n-propylamide | do | Do. |
| 1-(3'-amino-4'-methoxybenzoylamino)-benzene-4-carboxylic acid-n-butylamide | do | Do. |
| 1-(3'-amino-4'-methoxybenzoylamino)-2-chlorobenzene-5-carboxylic acid-methylamide | do | Do. |
| 1-(3'-amino-4'-methoxybenzoylamino)-2-methylbenzene-5-carboxylic acid amide | do | Do. |

| Diazo component | Coupling component | Tint |
|---|---|---|
| 1-(3'-amino-4'-methoxybenzoylamino)-benzene-3-sulfonic acid amide. | ...do... | Do. |
| 1-(3'-amino-4'-methoxybenzoylamino)-benzene-4-sulfonic acid methylamide. | ...do... | Do. |
| 1-(3'-amino-4'-methoxybenzoylamino)-benzene-4-sulfonic acid ethylamide. | ...do... | Do. |
| 1-(3'-amino-4'-methoxybenzoylamino)-benzene-3-carboxylic acid amide. | ...do... | Do. |
| 1-(3'-amino-4'-methoxybenzoylamino)-2-chlorobenzene-5-sulfonic acid amide. | ...do... | Do. |
| 1-(3'-amino-4'-methoxybenzoylamino)-2-methoxybenzene-5-sulfonic acid amide. | ...do... | Do. |
| 1-(3'-amino-4'-methoxybenzoylamino)-2-chlorobenzene-4-sulfonic acid amide. | ...do... | Do. |
| 1-(3'-amino-4'-methoxybenzoylamino)-4-acetylaminobenzene. | ...do... | Do. |
| 1-(3'-amino-4'-methoxybenzoylamino)-4-propionylaminobenzene. | ...do... | Do. |
| 1-(3'-amino-4'-methoxybenzoylamino)-2-chloro-5-acetylaminobenzene. | ...do... | Do. |
| 1-(3'-amino-4'-ethoxybenzoylamino)-benzene-4-carboxylic acid amide. | ...do... | Do. |
| 1-(3'-amino-benzoylamino)-benzene-4-sulfonic acid amide. | 1-(2',3'-hydroxynaphthoylamino)-4-acetylaminobenzene. | Red. |
| 1-(3'-amino-4'-methylbenzoylamino)-benzene-4-sulfonic acid amide. | 1-(2',3'-hydroxynaphthoylamino)-2,4-dimethoxy-5-chlorobenzene. | Do. |
| 1-(3'-amino-4'-methylbenzoylamino)-benzene-4-carboxylic acid amide. | 1-(2',3'-hydroxynaphthoylamino)-2,5-dimethoxy-4-chlorobenzene. | Do. |
| 1-(3'-amino-4'-methylbenzoylamino)-2-chlorobenzene-5-carboxylic acid amide. | 1-(2',3'-hydroxynaphthoylamino)-2,4-dimethoxy-5-chlorobenzene. | Do. |
| 1-(3'-amino-4'-methoxybenzoylamino)-benzene-4-carboxylic acid amide. | 1-(2',3'-hydroxynaphthoylamino)-2-methoxy-4-acetylamino-5-chlorobenzene. | Carmine. |
| Do. | 1-(2',3'-hydroxynaphthoylamino)-2-methyl-5-chlorobenzene. | Do. |
| Do. | 1-(2',3'-hydroxynaphthoylamino)-4-methoxybenzene. | Red. |
| Do. | 1-(2',3'-hydroxynaphthoylamino-2-methyl-4-methoxybenzene. | Bluish-red. |
| Do. | 1-(2',3'-hydroxynaphthoylamino)-2,4-dimethoxybenzene. | Do. |
| Do. | 2-(2',3'-hydroxynaphthoylamino)-3-methoxy-diphenylene oxide. | Do. |
| Do. | 2-(2',3'-hydroxynaphthoylamino)-naphthalene. | Do. |
| Do. | 1-(2',3'-hydroxynaphthoylamino)-naphthalene. | Do. |
| Do. | 1-acetoacetylamino-2-methoxy-4-acetylamino-5-chlorobenzene. | Yellow. |
| Do. | 1-p-tolyl-3-methyl-5-pyrazolone. | Reddish-yellow. |
| Do. | 1-(2',3'-hydroxynaphthoylamino)-3-nitrobenzene. | Carmine. |
| Do. | 1-(2',3'-hydroxynaphthoylamino)-2-methoxybenzene-5-carboxylic acid amide. | Do. |
| 1-(3'-amino-4'-methoxybenzoylamino)-benzene-4-carboxylic acid methylamide. | 1-(2',3'-hydroxynaphthoylamino)-2,5-dimethoxy-4-chlorobenzene. | Red. |
| 1-(3'-amino-4'-methoxybenzoylamino)-2-methylbenzene-5-sulfonic acid amide. | ...do... | Do. |
| 1-(3'-amino-4'-methoxybenzene-sulfonylamino)-benzene-4-carboxylic acid amide. | ...do... | Do. |
| 1-(3'-amino-4'-chlorobenzoylamino)-benzene-4-carboxylic acid amide. | 1-(2',3'-hydroxynaphthoylamino)-4-ethoxybenzene. | Yellowish-red. |
| Do. | 1-(2',3'-hydroxynaphthoylamino)-4-acetylaminobenzene. | Do. |
| Do. | 1-(2',3'-hydroxynaphthoylamino)-2-methylbenzene. | Do. |
| Do. | 1-(2',3'-hydroxynaphthoylamino)-2-methyl-4-chlorobenzene. | Do. |
| Do. | 1-(2',3'-hydroxynaphthoylamino)-4-benzoylaminobenzene. | Red. |
| Do. | 1-acetoacetylamino-2,5-dimethoxy-4-chlorobenzene. | Yellow. |
| 1-(3'-amino-4'-chlorobenzoylamino)-benzene-4-carboxylic acid methylamide. | 1-(2',3'-hydroxynaphthoylamino)-4-methoxybenzene. | Yellowish-red. |
| Do. | 1-(2',3'-hydroxynaphthoylamino)-2-methoxybenzene. | Do. |
| 1-(3'-amino-4'-chlorobenzoylamino)-benzene-4-sulfonic acid amide. | 1-(2',3'-hydroxynaphthoylamino)-4-acetylaminobenzene. | Do. |
| 1-(3'-amino-4'-chlorobenzoylamino)-2-chlorobenzene-5-carboxylic acid amide. | ...do... | Do. |
| 1-(3'-amino-4'-chlorobenzoyl-amino)-4-acetylaminobenzene. | 1-(2',3'-hydroxynaphthoylamino)-4-acetylaminobenzene. | Do. |
| 1-(3'-amino-4'-carbomethoxybenzoylamino)-benzene-4-carboxylic acid amide. | 1-(2',3'-hydroxynaphthoylamino)-4-ethoxybenzene. | Red. |
| 1-(3'-amino-4'-carboethoxybenzoylamino)-benzene-4-carboxylic acid amide. | 1-(2',3'-hydroxynaphthoylamino)-4-methoxybenzene. | Do. |

I claim:
1. A water-insoluble monoazo-dyestuff of the formula

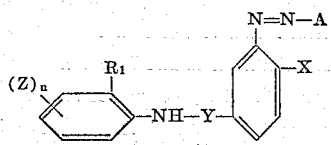

wherein X represents a member selected from the group consisting of hydrogen, chlorine, methyl, methoxy, ethoxy, carbomethoxy and carboethoxy, Y represents a member selected from the group consisting of CO and $SO_2$, $R_1$ represents a member selected from the group consisting of hydrogen, chlorine, methyl and methoxy, Z is bound onto the benzene radical in a position selected from the group consisting of meta- and para- to the —NH— group and represents a member selected from the group consisting of carboxylic acid amide, carboxylic acid monoalkylamide, sulfonic acid amide, sulfonic acid monoalkylamide and alkoylamino, $n$ stands for one of the numbers 1 and 2 and A represents the radical of a coupling component selected from the group consisting of a 2,3-hydroxynaphthoic acid arylamide of the benzene, naphthalene and diphenyl oxide series, an acetoacetic acid arylamide of the benzene series, 1-phenyl-3-methyl-5-pyrazolone and 1-p-tolyl-3-methyl-5-pyrazolone.

2. The monoazo-dyestuff of the formula

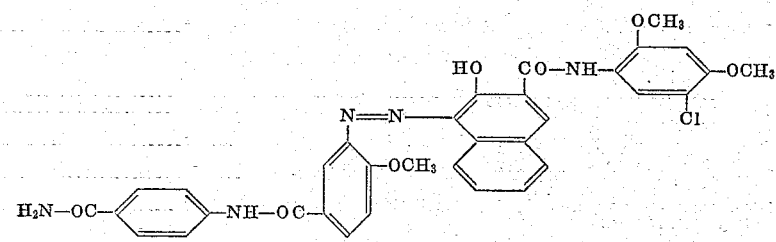

3. The monoazo-dyestuff of the formula
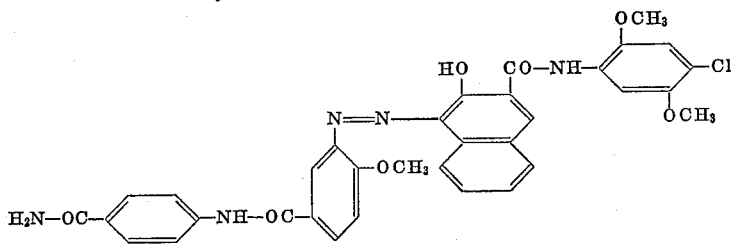
4. The monoazo-dyestuff of the formula
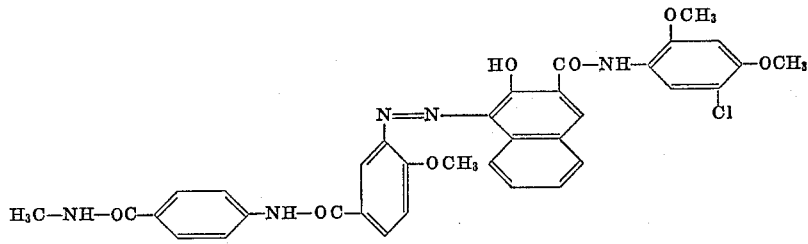
5. The monoazo-dyestuff of the formula
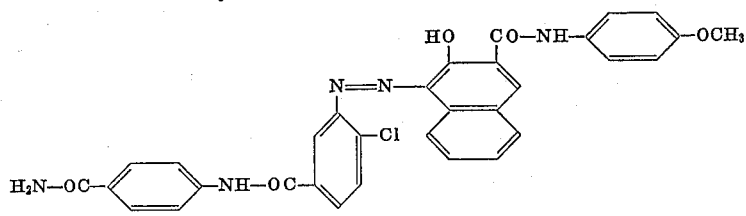
6. The monoazo-dyestuff of the formula
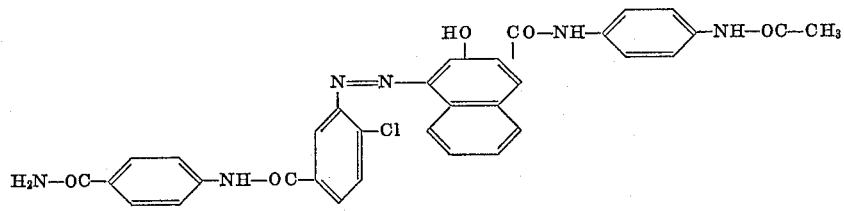
References Cited by the Examiner
UNITED STATES PATENTS
2,915,518  12/59  Fischer _____ 260—203
FOREIGN PATENTS
889,739  9/53  Germany.
CHARLES B. PARKER, *Primary Examiner.*